United States Patent
Baker et al.

(10) Patent No.: US 10,144,666 B2
(45) Date of Patent: Dec. 4, 2018

(54) PROCESSING ORGANICS AND INORGANICS IN A SUBMERGED COMBUSTION MELTER

(71) Applicant: JOHNS MANVILLE, Denver, CO (US)

(72) Inventors: John Wayne Baker, Golden, CO (US); Mark William Charbonneau, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/918,357

(22) Filed: Oct. 20, 2015

(65) Prior Publication Data

US 2017/0107139 A1  Apr. 20, 2017

(51) Int. Cl.
| | | |
|---|---|---|
| *C03B 5/235* | (2006.01) |
| *F23G 5/08* | (2006.01) |
| *C03B 5/00* | (2006.01) |
| *C03B 5/04* | (2006.01) |
| *C03B 5/44* | (2006.01) |

(52) U.S. Cl.
CPC ............... *C03B 5/005* (2013.01); *C03B 5/04* (2013.01); *C03B 5/2356* (2013.01); *C03B 5/44* (2013.01); *F23G 5/085* (2013.01); *C03B 2211/22* (2013.01); *C03B 2211/23* (2013.01); *F23G 2202/20* (2013.01)

(58) Field of Classification Search
CPC ..... C04B 18/0418; C04B 28/02; C04B 18/08; C04B 18/24; C04B 18/04; C04B 18/141; C04B 18/241; C04B 18/146; C04B 18/023; C04B 18/021; C04B 18/06; C04B 18/026; C04B 18/082; C04B 18/022; C04B 18/101; C04B 18/02; C03B 5/2356; C03B 5/005; F23G 7/001; F23G 7/008
See application file for complete search history.

(56) References Cited

U.S. PATENT DOCUMENTS

| | | |
|---|---|---|
| 1,579,353 A | 4/1926 | Good |
| 1,636,151 A | 7/1927 | Schofield |

(Continued)

FOREIGN PATENT DOCUMENTS

| | | |
|---|---|---|
| DE | 36 29 965 A1 | 3/1988 |
| DE | 40 00 358 C2 | 3/1993 |

(Continued)

OTHER PUBLICATIONS

"Gamma Irradiators for Radiation Processing" Booklet, International Atomic Energy Agency, Vienna, Austria.

(Continued)

*Primary Examiner* — Jodi C Franklin
(74) *Attorney, Agent, or Firm* — Robert D. Touslee

(57) ABSTRACT

Primary inorganic feedstock material is introduced into the melting region of an SCM melter. The material is heated with a burner to form a turbulent melt matrix. The burner exit is disposed below the top surface of the turbulent melt matrix. A mixture of secondary inorganic material and organic material is introduced into the melting region below the top surface of the turbulent melt mixture. The mixture is heated with the burner to incorporate the secondary inorganic material into the turbulent melt matrix and combust at least some of the organic material to produce heat.

18 Claims, 5 Drawing Sheets

(56) References Cited

U.S. PATENT DOCUMENTS

| | | |
|---|---|---|
| 1,679,295 A | 7/1928 | Dodge |
| 1,706,857 A | 3/1929 | Mathe |
| 1,716,433 A | 6/1929 | Ellis |
| 1,675,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,690,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,565 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A * | 10/1985 | Won .................... C03B 5/2356 65/134.4 |
| 4,549,896 A | 10/1985 | Streicher et al. |
| 4,599,100 A | 7/1986 | Demarest |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A | 1/1989 | Welton |
| 4,798,616 A | 1/1989 | Knavish et al. |

(56) References Cited

U.S. PATENT DOCUMENTS

| | | | |
|---|---|---|---|
| 4,812,372 A | 3/1989 | Kithany | |
| 4,814,387 A | 3/1989 | Donat | |
| 4,816,056 A | 3/1989 | Tsai et al. | |
| 4,818,265 A | 4/1989 | Krumwiede et al. | |
| 4,872,993 A * | 10/1989 | Harrison | C02F 1/281 |
| | | | 210/666 |
| 4,877,436 A | 10/1989 | Sheinkop | |
| 4,877,449 A | 10/1989 | Khinkis | |
| 4,878,829 A | 11/1989 | Anderson | |
| 4,882,736 A | 11/1989 | Pieper | |
| 4,886,539 A | 12/1989 | Gerutti et al. | |
| 4,900,337 A | 2/1990 | Zortea et al. | |
| 4,919,700 A | 4/1990 | Pecoraro et al. | |
| 4,927,886 A | 5/1990 | Backderf et al. | |
| 4,932,035 A | 6/1990 | Pieper | |
| 4,953,376 A | 9/1990 | Merlone | |
| 4,963,731 A | 10/1990 | King | |
| 4,969,942 A | 11/1990 | Schwenninger et al. | |
| 4,973,346 A | 11/1990 | Kobayashi et al. | |
| 5,011,086 A | 4/1991 | Sonnleitner | |
| 5,032,230 A | 7/1991 | Shepherd | |
| 5,052,874 A | 10/1991 | Johanson | |
| 5,062,789 A | 11/1991 | Gitman | |
| 5,097,802 A | 3/1992 | Clawson | |
| 5,168,109 A | 12/1992 | Backderf et al. | |
| 5,169,424 A | 12/1992 | Grinnen et al. | |
| 5,194,747 A | 3/1993 | Culpepper et al. | |
| 5,199,866 A | 4/1993 | Joshi et al. | |
| 5,204,082 A | 4/1993 | Schendel | |
| 5,217,363 A * | 6/1993 | Brais | F23D 14/22 |
| | | | 239/401 |
| 5,299,929 A | 4/1994 | Yap | |
| 5,360,171 A | 11/1994 | Yap | |
| 5,374,595 A | 12/1994 | Dumbaugh et al. | |
| 5,405,082 A | 4/1995 | Brown et al. | |
| 5,412,882 A | 5/1995 | Zippe | |
| 5,449,286 A | 9/1995 | Snyder et al. | |
| 5,473,885 A | 12/1995 | Hunter, Jr. et al. | |
| 5,483,548 A | 1/1996 | Coble | |
| 5,490,775 A | 2/1996 | Joshi et al. | |
| 5,522,721 A | 6/1996 | Drogue et al. | |
| 5,527,984 A * | 6/1996 | Stultz | F23G 7/065 |
| | | | 110/213 |
| 5,545,031 A | 8/1996 | Joshi et al. | |
| 5,575,637 A | 11/1996 | Slavejkov et al. | |
| 5,586,999 A | 12/1996 | Kobayashi | |
| 5,595,703 A | 1/1997 | Swaelens et al. | |
| 5,606,965 A | 3/1997 | Panz et al. | |
| 5,613,994 A | 3/1997 | Muniz et al. | |
| 5,615,668 A | 4/1997 | Panz et al. | |
| 5,636,623 A | 6/1997 | Panz et al. | |
| 5,672,827 A | 9/1997 | Jursich | |
| 5,713,668 A | 2/1998 | Lunghofer et al. | |
| 5,718,741 A | 2/1998 | Hull et al. | |
| 5,724,901 A * | 3/1998 | Guy | C03B 3/026 |
| | | | 110/104 B |
| 5,736,476 A | 4/1998 | Warzke et al. | |
| 5,743,723 A | 4/1998 | Iatrides et al. | |
| 5,765,964 A | 6/1998 | Calcote et al. | |
| 5,814,121 A | 9/1998 | Travis | |
| 5,829,962 A | 11/1998 | Drasek et al. | |
| 5,833,447 A | 11/1998 | Bodelin et al. | |
| 5,849,058 A | 12/1998 | Takeshita et al. | |
| 5,863,195 A | 1/1999 | Feldermann | |
| 5,887,978 A | 3/1999 | Lunghofer et al. | |
| 5,944,507 A | 8/1999 | Feldermann | |
| 5,944,864 A | 8/1999 | Hull et al. | |
| 5,954,498 A | 9/1999 | Joshi et al. | |
| 5,975,886 A | 11/1999 | Phillippe | |
| 5,979,191 A | 11/1999 | Jian | |
| 5,984,667 A | 11/1999 | Phillippe et al. | |
| 5,993,203 A | 11/1999 | Koppang | |
| 6,029,910 A | 2/2000 | Joshi et al. | |
| 6,036,480 A | 3/2000 | Hughes et al. | |
| 6,039,787 A | 3/2000 | Edlinger | |
| 6,044,667 A | 4/2000 | Chenoweth | |
| 6,045,353 A | 4/2000 | VonDrasek et al. | |
| 6,068,468 A | 5/2000 | Phillippe et al. | |
| 6,071,116 A | 6/2000 | Phillippe et al. | |
| 6,074,197 A | 6/2000 | Phillippe | |
| 6,077,072 A | 6/2000 | Marin et al. | |
| 6,085,551 A | 7/2000 | Pieper et al. | |
| 6,109,062 A | 8/2000 | Richards | |
| 6,113,389 A | 9/2000 | Joshi et al. | |
| 6,116,170 A * | 9/2000 | Yamada | C03B 1/02 |
| | | | 110/206 |
| 6,116,896 A | 9/2000 | Joshi et al. | |
| 6,120,889 A | 9/2000 | Turner et al. | |
| 6,123,542 A | 9/2000 | Joshi et al. | |
| 6,126,438 A | 10/2000 | Joshi et al. | |
| 6,154,481 A | 11/2000 | Sorg et al. | |
| 6,156,285 A | 12/2000 | Adams et al. | |
| 6,171,100 B1 | 1/2001 | Joshi et al. | |
| 6,178,777 B1 | 1/2001 | Chenoweth | |
| 6,183,848 B1 | 2/2001 | Turner et al. | |
| 6,210,151 B1 | 4/2001 | Joshi et al. | |
| 6,210,703 B1 | 4/2001 | Novich | |
| 6,237,369 B1 | 5/2001 | LeBlanc et al. | |
| 6,241,514 B1 | 6/2001 | Joshi et al. | |
| 6,244,197 B1 | 6/2001 | Coble | |
| 6,244,857 B1 | 6/2001 | VonDrasek et al. | |
| 6,247,315 B1 | 6/2001 | Marin et al. | |
| 6,250,136 B1 | 6/2001 | Igreja | |
| 6,250,916 B1 | 6/2001 | Phillipe et al. | |
| 6,274,164 B1 | 8/2001 | Novich | |
| 6,276,924 B1 | 8/2001 | Joshi et al. | |
| 6,276,928 B1 | 8/2001 | Joshi et al. | |
| 6,293,277 B1 | 9/2001 | Panz et al. | |
| 6,314,760 B1 | 11/2001 | Chenoweth | |
| 6,314,896 B1 | 11/2001 | Marin et al. | |
| 6,332,339 B1 | 12/2001 | Kawaguchi et al. | |
| 6,338,337 B1 | 1/2002 | Panz et al. | |
| 6,339,610 B1 | 1/2002 | Hoyer et al. | |
| 6,344,747 B1 | 2/2002 | Lunghofer et al. | |
| 6,357,264 B1 | 3/2002 | Richards | |
| 6,386,271 B1 | 5/2002 | Kawamoto et al. | |
| 6,418,755 B2 | 7/2002 | Chenoweth | |
| 6,422,041 B1 | 7/2002 | Simpson et al. | |
| 6,454,562 B1 | 9/2002 | Joshi et al. | |
| 6,460,376 B1 * | 10/2002 | Jeanvoine | C03B 3/005 |
| | | | 65/134.2 |
| 6,536,238 B2 | 3/2003 | Kawaguchi et al. | |
| 6,536,651 B2 | 3/2003 | Ezumi et al. | |
| 6,558,606 B1 | 5/2003 | Kulkarni et al. | |
| 6,578,779 B2 | 6/2003 | Dion | |
| 6,660,106 B1 | 12/2003 | Babel et al. | |
| 6,694,791 B1 | 2/2004 | Johnson et al. | |
| 6,701,617 B2 | 3/2004 | Li et al. | |
| 6,701,751 B2 | 3/2004 | Arechaga et al. | |
| 6,705,118 B2 | 3/2004 | Simpson et al. | |
| 6,708,527 B1 | 3/2004 | Ibarlucea et al. | |
| 6,711,942 B2 | 3/2004 | Getman et al. | |
| 6,715,319 B2 | 4/2004 | Barrow et al. | |
| 6,722,161 B2 | 4/2004 | LeBlanc | |
| 6,736,129 B1 | 5/2004 | Sjith | |
| 6,739,152 B2 | 5/2004 | Jeanvoine et al. | |
| 6,796,147 B2 | 9/2004 | Borysowicz et al. | |
| 6,797,351 B2 | 9/2004 | Kulkarni et al. | |
| 6,854,290 B2 | 2/2005 | Hayes et al. | |
| 6,857,999 B2 * | 2/2005 | Jeanvoine | F23G 5/033 |
| | | | 588/252 |
| 6,883,349 B1 * | 4/2005 | Jeanvoine | C03B 3/00 |
| | | | 423/326 |
| 6,918,256 B2 | 7/2005 | Gutmark et al. | |
| 7,027,467 B2 | 4/2006 | Baev et al. | |
| 7,116,888 B1 | 10/2006 | Aitken et al. | |
| 7,134,300 B2 | 11/2006 | Hayes et al. | |
| 7,168,395 B2 | 1/2007 | Engdahl | |
| 7,175,423 B1 | 2/2007 | Pisano et al. | |
| 7,231,788 B2 | 6/2007 | Karetta et al. | |
| 7,273,583 B2 | 9/2007 | Rue et al. | |
| 7,330,634 B2 | 2/2008 | Aitken et al. | |
| 7,383,698 B2 | 6/2008 | Ichinose et al. | |
| 7,392,668 B2 | 7/2008 | Adams et al. | |

(56) References Cited

U.S. PATENT DOCUMENTS

| | | |
|---|---|---|
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 9,346,696 B2 * | 5/2016 | Coggin, Jr. ............ C03B 3/026 |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 * | 11/2002 | Jeanvoine ............... C03B 5/225 |
| | | 65/134.5 |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0101859 A1 | 5/2006 | Tagaki et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 * | 2/2008 | Li ............... F02C 3/08 |
| | | 122/1 R |
| 2008/0227615 A1 | 9/2008 | McGinnis et al. |
| 2008/0256981 A1 * | 10/2008 | Jacques ............... C03B 3/02 |
| | | 65/19 |
| 2008/0276652 A1 * | 11/2008 | Bauer ............... C03B 5/2356 |
| | | 65/454 |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 * | 7/2009 | Jacques ............... C03B 3/00 |
| | | 501/17 |
| 2009/0220899 A1 | 9/2009 | Spangelo et al. |
| 2009/0235695 A1 * | 9/2009 | Pierrot ............... C03B 5/20 |
| | | 65/356 |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 * | 4/2010 | Cowles ............... F23C 3/004 |
| | | 126/360.1 |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 * | 12/2010 | Zhang ............... C03B 5/2353 |
| | | 65/135.9 |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 * | 3/2011 | Rouchy ............... C03B 5/235 |
| | | 126/39 E |
| 2011/0088432 A1 | 4/2011 | Purnode et al. |
| 2011/0107670 A1 * | 5/2011 | Galley ............... C01B 3/32 |
| | | 48/197 R |
| 2011/0236846 A1 * | 9/2011 | Rue ............... F27B 3/205 |
| | | 432/195 |
| 2011/0308280 A1 | 12/2011 | Huber |
| 2012/0033792 A1 | 2/2012 | Kulik et al. |
| 2012/0073406 A1 * | 3/2012 | Ki ............... C04B 5/06 |
| | | 75/414 |
| 2012/0077135 A1 * | 3/2012 | Charbonneau ........... C03B 3/00 |
| | | 432/11 |
| 2012/0104306 A1 | 5/2012 | Kamiya et al. |
| 2012/0125052 A1 * | 5/2012 | Dong ............... C03B 1/02 |
| | | 65/136.3 |
| 2012/0137736 A1 * | 6/2012 | Sakamoto ............... C03B 3/00 |
| | | 65/66 |
| 2012/0159992 A1 * | 6/2012 | Sakamoto ............... C03B 3/00 |
| | | 65/66 |
| 2012/0159994 A1 * | 6/2012 | Sakamoto ............... C03B 3/026 |
| | | 65/136.3 |
| 2012/0216576 A1 | 6/2012 | Boughton et al. |
| 2012/0216567 A1 | 8/2012 | Boughton et al. |
| 2012/0216568 A1 | 8/2012 | Fisher et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |

(56) References Cited

U.S. PATENT DOCUMENTS

| | | | |
|---|---|---|---|
| 2013/0086952 A1* | 4/2013 | Charbonneau | C03B 37/06 65/377 |
| 2013/0123990 A1 | 5/2013 | Kulik et al. | |
| 2013/0279532 A1 | 10/2013 | Ohmstede et al. | |
| 2013/0283861 A1 | 10/2013 | Mobley et al. | |
| 2013/0327092 A1 | 12/2013 | Charbonneau | |
| 2014/0007623 A1* | 1/2014 | Charbonneau | C03B 37/022 65/377 |
| 2014/0090422 A1 | 4/2014 | Charbonneau et al. | |
| 2014/0090423 A1 | 4/2014 | Charbonneau et al. | |
| 2014/0144185 A1 | 5/2014 | Shock et al. | |

FOREIGN PATENT DOCUMENTS

| | | | |
|---|---|---|---|
| DE | 44 24 814 A1 | 1/1996 | |
| DE | 196 19 919 A1 | 8/1997 | |
| DE | 100 29 983 A1 | 1/2002 | |
| DE | 100 29 983 C2 | 9/2003 | |
| DE | 10 2005 033330 B3 | 8/2006 | |
| EP | 0 181 248 B1 | 10/1989 | |
| EP | 1 337 789 B1 | 12/2004 | |
| EP | 1 990 321 A1 | 11/2008 | |
| EP | 2 133 315 A1 | 12/2009 | |
| EP | 2 138 465 A2 | 12/2009 | |
| EP | 1 986 966 B1 | 4/2010 | |
| EP | 1 667 934 B1 | 2/2011 | |
| EP | 2 397 446 A2 | 12/2011 | |
| EP | 2 404 880 A1 | 1/2012 | |
| EP | 2 433 911 A1 | 3/2012 | |
| EP | 2 578 548 A2 | 4/2013 | |
| FR | 2 740 860 A1 | 9/1997 | |
| GB | 191301772 | 1/1914 | |
| GB | 191407633 | 3/1914 | |
| GB | 164073 A | 5/1921 | |
| GB | 1449439 | 9/1976 | |
| IT | 1208172 | 7/1989 | |
| JP | S58 199728 A | 11/1983 | |
| JP | 2000351633 A * | 12/2000 | C03B 3/026 |
| KR | 2000 0050572 A | 8/2000 | |
| KR | 100465272 B1 | 12/2004 | |
| RO | 114827 | 7/1999 | |
| WO | 1998055411 A1 | 12/1998 | |
| WO | 2008103291 A1 | 8/2008 | |
| WO | 2009091558 A1 | 7/2009 | |
| WO | 2010011701 A2 | 1/2010 | |
| WO | 2010045196 A3 | 4/2010 | |
| WO | 2012048790 A1 | 4/2012 | |

OTHER PUBLICATIONS

Furman, BJ, ME 120 Experimental Methods Vibration Measurement, San Jose University Department of Mechanical and Aerospace Engineering.
Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Gerber, J., "Les Densimetres Industriels," Petrole et Techniques, Association Francaise des Techniciens du Petrole, Jun. 1, 1989, pp. 26-27, No. 349, Paris, France.
Rue et al., "Submerged Combustion Melting of Glass," International Journal of Applied Glass Science, Nov. 9, 2011, pp. 262-274, vol. 2, No. 4.
National Laboratory, US DOE contract No. DE-AC09-08SR22470, Oct. 2011.
"AccuTru Temperature Measurement," AccuTru International Corporation, 2003.
"Glass Technologies—The Legacy of a Successful Public-Private Partnership", 2007, U.S. Department of Energy, pp. 1-32.
"Glass Melting Technology—A Technical and Economic Assessment," 2004, U.S. Department of Energy, pp. 1-292.
Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Melter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, received in Apr. 2012 at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass Industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

* cited by examiner

PROCESSING ORGANICS AND INORGANICS IN A SUBMERGED COMBUSTION MELTER

BACKGROUND

In submerged combustion melting (SCM), combustion gases are injected beneath a surface of a molten matrix and rise upward through the melt. The matrix can include glass and/or inorganic non-metallic feedstocks such as rock (basalt) and mineral wool (stone wool). Regardless of the material utilized, it is heated at a high efficiency via the intimate contact with the combustion gases and melts into a matrix. Using submerged combustion burners produces violent turbulence of the molten matrix and results in a high degree of mechanical energy in the submerged combustion melter.

SUMMARY

In one aspect, the technology relates to a method including: introducing a primary inorganic feedstock material into a melting region of an SCM melter; heating the primary inorganic feedstock material with a burner so as to form a turbulent melt matrix, wherein an exit of the burner is disposed below a top surface of the turbulent melt matrix; introducing a mixture into the melting region, wherein the mixture includes at least one of a secondary inorganic material and an organic material, and is introduced below the top surface of the turbulent melt mixture; and heating the mixture with the burner so as to incorporate the secondary inorganic material of the mixture material into the turbulent melt matrix and combust at least some of the organic material to produce heat. In an embodiment, the mixture includes an organic compound having a heating value of at least 5000 BTU/kg. In another embodiment, the mixture includes at least one of a tar sand waste, a fracking waste fluid, a household waste material, and a chemical processing waste material. In yet another embodiment, the inorganic feedstock is selected from the group consisting of glass batch, basalt rock, and mixtures thereof. In still another embodiment, the inorganic feedstock consists essentially of glass batch.

In another embodiment of the above aspect, the inorganic feedstock consists essentially of basalt. In an embodiment, the mixture is introduced as a slurry. In another embodiment, the method includes introducing a fuel to the melt matrix via the exit of the burner, wherein the mixture is introduced proximate the fuel. In yet another embodiment the mixture is introduced via the exit of the burner. In still another embodiment, the fuel substantially surrounds the mixture. In another embodiment, the method includes introducing an oxidant to the melt matrix via the exit of the burner.

In another aspect, the technology relates to a burner having: an internal conduit including a first end, an open second end, and a bore having a longitudinal axis, wherein the first end is configured to be connected to a source of a waste mixture, and wherein the second end is configured to discharge the waste mixture; a first annular conduit disposed about the internal conduit, wherein the first annular conduit has a first end and an open annular end, wherein the first end is configured to be connected to a source of at least one of a fuel and an oxidant, and wherein the second end is configured to discharge the at least one of the fuel and the oxidant; and a second annular conduit disposed about the first annular conduit, wherein the second annular conduit has a first end and an open annular end, wherein the first end is configured to be connected to the source of the other of the at least one of the fuel and the oxidant, and wherein the second end is configured to discharge the other of the at least one of the fuel and the oxidant. In an embodiment, the burner further includes an external conduit disposed about the second annular conduit, wherein the external annular conduit has a first end and a closed second end, wherein the first end is configured to be connected to a source of a cooling fluid. In another embodiment, the first annular conduit is configured to conduct the oxidant, and wherein the second annular conduit is configured to conduct the fuel.

In another aspect, the technology relates to a method including: melting with a burner, in a melting region of an SCM melter, a feedstock material so as to form a turbulent melt matrix, wherein an exit of the burner is disposed below a top surface of the turbulent melt matrix; introducing a mixture into the melting region, wherein the mixture is substantially different than the feedstock material and is introduced below the top surface of the turbulent melt mixture; and heating the mixture with the burner so as to incorporate the mixture into the turbulent melt matrix and combust at least some of the mixture to produce heat. In an embodiment, the feedstock material consists essentially of at least one of glass batch and basalt. In another embodiment, the mixture includes at least one of an organic compound and an inorganic compound. In yet another embodiment, the mixture includes at least one of a tar sand waste, a fracking waste fluid, a household waste material, and a chemical processing waste material. In still another embodiment, the mixture is introduced proximate the burner exit.

In another embodiment of the above aspect, the mixture is introduced at the burner exit. In an embodiment, the method includes introducing at least one of an oxidant and a fuel to the turbulent melt matrix at the burner exit. In another embodiment, during introduction at the burner exit, the at least one of the oxidant and the fuel substantially surrounds the mixture. In yet another embodiment, during introduction, the oxidant substantially surrounds the mixture and the fuel substantially surrounds the oxidant.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

In the following description, numerous details are set forth to provide an understanding of various melter apparatus and process examples in accordance with the present disclosure. However, it will be understood by those skilled in the art that the melter apparatus and processes of using same may be practiced without these details and that numerous variations or modifications from the described examples may be possible which are nevertheless considered within the appended claims. All published patent applications and patents referenced herein are hereby incorporated by reference herein in their entireties.

Figure 1:
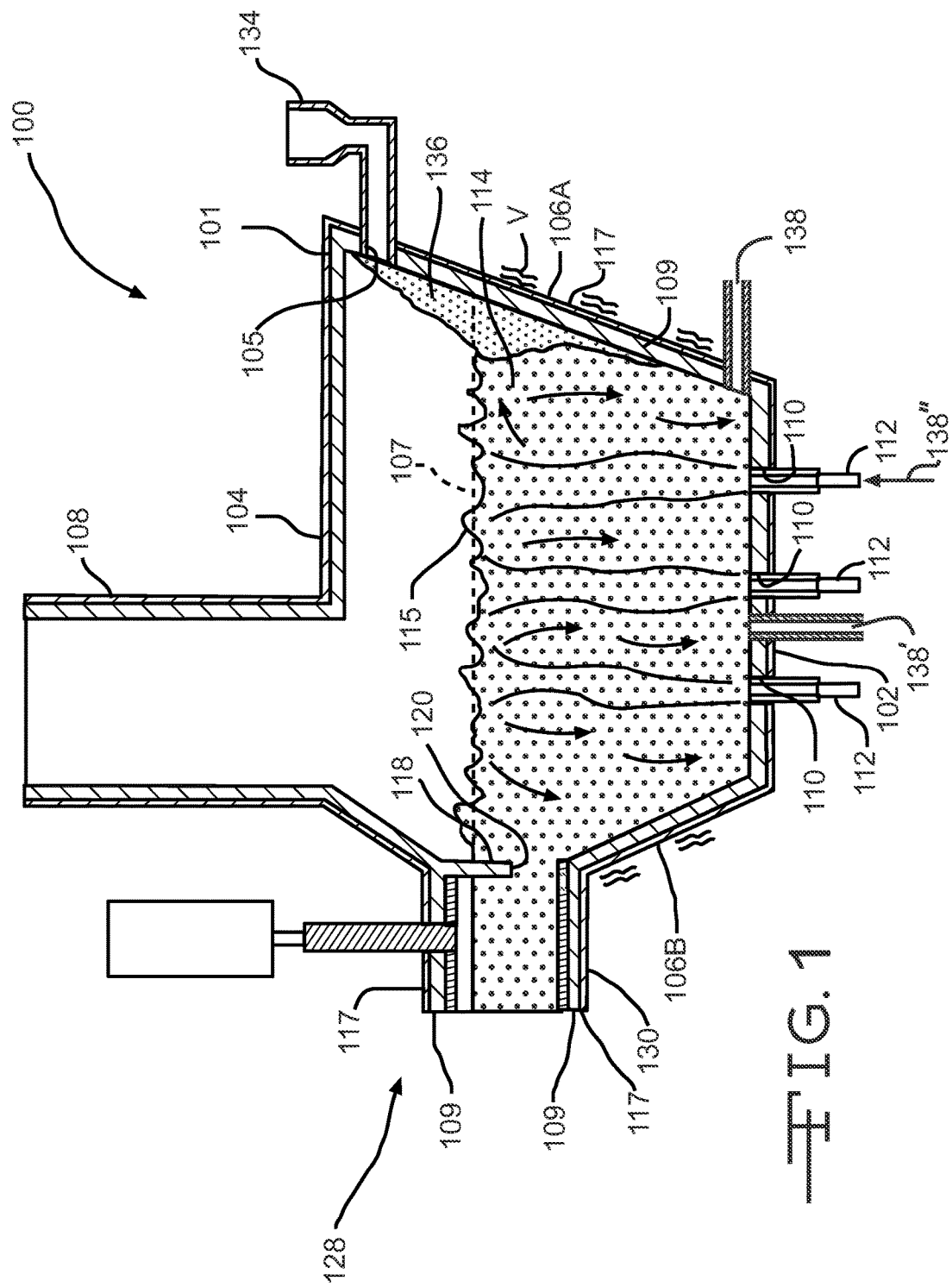
FIG. 1 depicts a side sectional view of a melter that may be utilized in conjunction with the examples of the technology described herein.

FIG. 1 depicts a side sectional view of a melter system 100 that may be utilized in conjunction with the examples of the technology described herein. The melter system 100 is a submerged combustion melter (SCM) and is described in more detail in U.S. Patent Application Publication No. 2013/0283861, the disclosure of which is hereby incorporated by reference herein in its entirety. Melter apparatus or melt vessel 101 of FIG. 1 includes a floor 102, a roof or ceiling 104, a feed end wall 106A, a first portion of an exit end wall 106B, and a second portion of the exit end wall 106C. Each of the floor 102, the roof 104, and walls 106A, 106B, and 106C comprise a metal shell 117 and a refractory panel 109, some or all of which may be fluid-cooled. Exit end wall portion 106C may form an angle with respect to a skimmer 118, proximate an exit port 120.

The melt vessel 101 may be fluid cooled by using a gaseous, liquid, or combination thereof, heat transfer media. In certain examples, the wall may have a refractory liner at least between the panels and the molten glass. Certain systems may cool various components by directing a heat transfer fluid through those components. In certain examples, the refractory cooled-panels of the walls, the fluid-cooled skimmer, the fluid-cooled dam, the walls of the fluid-cooled transition channel, and the burners may be cooled by a heat transfer fluid selected from the group consisting of gaseous, liquid, or combinations of gaseous and liquid compositions that function or are capable of being modified to function as a heat transfer fluid. Different cooling fluids may be used in the various components, or separate portions of the same cooling composition may be employed in all components. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids, which may be organic, inorganic, or some combination thereof, for example, salt solutions, glycol solutions, oils and the like. Other possible heat transfer fluids include water, steam (if cooler than the oxygen manifold temperature), carbon dioxide, or mixtures thereof with nitrogen. Heat transfer fluids may be compositions including both gas and liquid phases, such as the higher chlorofluorocarbons.

The melt vessel 101 further includes an exhaust stack 108, and openings 110 for submerged combustion burners 112, which create during operation a highly turbulent melt matrix indicated at 114. Highly turbulent melt matrix 114 may have an uneven top surface 115 due to the nature of submerged combustion. An average level 107 is illustrated with a dashed line. In certain examples, burners 112 are positioned to emit combustion products into molten matrix in the melting zone 114 in a fashion so that the gases penetrate the melt generally perpendicularly to floor 102. In other examples, one or more burners 112 may emit combustion products into the melt at an angle to floor 102.

In an SCM, combustion gases emanate from burners 112 under the level of a molten matrix. The burners 112 may be floor-mounted, wall-mounted, or in melter examples comprising more than one submerged combustion burner, any combination thereof (for example, two floor mounted burners and one wall mounted burner). These combustion gases may be substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

A burner 112 may be an air-fuel burner that combusts one or more fuels with only air, or an oxy-fuel burner that combusts one or more fuels with either oxygen alone, or employs oxygen-enriched air, or some other combination of air and oxygen, including combustion burners where the primary oxidant is air, and secondary and tertiary oxidants are oxygen. Burners may be comprised of metal, ceramic, ceramic-lined metal, or combination thereof. Air in an air-fuel mixture may include ambient air as well as gases having the same molar concentration of oxygen as air. Oxygen-enriched air having an oxygen concentration greater than 121 mole percent may be used. Oxygen may include pure oxygen, such as industrial grade oxygen, food grade oxygen, and cryogenic oxygen. Oxygen-enriched air may have 50 mole percent or more oxygen, and in certain examples may be 90 mole percent or more oxygen. Oxidants such as air, oxygen-enriched air, and pure oxygen may be supplied from a pipeline, cylinders, storage facility, cryogenic air separation unit, membrane permeation separator, or adsorption unit.

The fuel burned by the burners may be a combustible composition (either in gaseous, liquid, or solid form, or any flowable combination of these) having a major portion of, for example, methane, natural gas, liquefied natural gas, propane, atomized oil, powders or the like. Contemplated fuels may include minor amounts of non-fuels therein, including oxidants, for purposes such as premixing the fuel with the oxidant, or atomizing liquid fuels.

At least some of the burners may be mounted below the melt vessel, and in certain examples the burners may be positioned in one or more parallel rows substantially perpendicular to a longitudinal axis of the melt vessel. In certain examples, the number of burners in each row may be proportional to width of the vessel. In certain examples the depth of the vessel may decrease as width of the vessel decreases. In certain other examples, an intermediate location may comprise a constant width zone positioned between an expanding zone and a narrowing zone of the vessel, in accordance with U.S. Patent Application Publication No. 2011/0308280, the disclosure of which is hereby incorporated by reference herein in its entirety.

Returning to FIG. 1, the primary raw feedstock material can be introduced into melt vessel 101 on a batch, semi-continuous or continuous basis. In some examples, a port 105 is arranged at end 106A of melt vessel 101 through which the primary raw feedstock material is introduced by a feeder 134. In some examples, a batch blanket 136 may form along wall 106A, as illustrated. Feed port 105 may be positioned above the average matrix melt level, indicated by dashed line 107. The amount of the initial raw material introduced into melt vessel 101 is generally a function of, for example, the capacity and operating conditions of melt vessel 101 as well as the rate at which the molten material is removed from melt vessel 101.

The primary raw feedstock material may include any material suitable for forming a molten matrix, such as glass and/or inorganic non-metallic feedstocks such as rock (basalt) and mineral wool (stone wool). With regard to glass matrices, specifically, limestone, glass, sand, soda ash, feldspar and mixtures thereof can be utilized. In one example, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in U.S. Published Patent Application No. 2008/0276652, the disclosure of which is hereby incorporated by reference herein in its entirety. The initial raw material can be provided in any form such as, for example, relatively small particles.

As noted herein, submerged combustion burners may produce violent turbulence of the molten matrix and may result in a high degree of mechanical energy (e.g., vibration V in FIG. 1) in the submerged combustion melter that, without modification, is undesirably transferred to the conditioning channel. Vibration may be due to one or more impacts from sloshing of the molten matrix, pulsing of the submerged combustion burners, popping of large bubbles above submerged burners, ejection of the molten matrix from main matrix melt against the walls and ceiling of melt vessel 101, and the like. Melter exit structure 128 comprises a fluid-cooled transition channel 30, having generally rectangular cross-section in melt vessel 101, although any other cross-section would suffice, such as hexagonal, trapezoidal, oval, circular, and the like. Regardless of cross-sectional shape, fluid-cooled transition channel 130 is configured to form a frozen matrix layer or highly viscous matrix layer, or combination thereof, on inner surfaces of fluid-cooled transition channel 130 and thus protect melter exit structure 128 from the mechanical energy imparted from the melt vessel 101 to melter exit structure 128.

The technologies described herein relate to the use of an SCM to process secondary mixtures that contain both organics compounds and inorganic compounds. This is an attractive method to process waste materials that may be hazardous or, at a minimum, would be landfilled. Organic compounds may be mixed with a liquid into a suspension, colloid, or slurry that has a measurable heat value in BTUs. Examples of such secondary mixtures may include tar-sand waste, waste oil, fracking waste fluids, household waste materials, chemical processing waste materials, biohazard waste, food waste, etc. Municipal waste (as collected from residential or commercial customers) can be mixed with fuel-oil. Although the secondary mixture should have some BTU value, very high BTU values are not necessarily required. As such, less flammable compounds such as paper may be used, as well as very flammable compounds such as fuel oils. In one example, the technologies contemplate introducing a secondary mixture of materials such as tar-sand waste products into an SCM as fuel. Hydrocarbons (e.g., waste motor oil) may be particularly desirable because they have a high heat value and are also generally difficult to dispose of in an environmentally sound practice. Tar-sand waste products typically include a mixture of sand and hydrocarbons or organics and are processed in the SCM melter. In doing so, the silica contained therein acts as a raw material for glass or rock-wool processes downstream of said SCM, while the organic materials act as a secondary fuel within the SCM. As such, mixtures that contain both organic and inorganic materials are desirable, since the organic materials can be combusted to heat the matrix, while the inorganic compounds can be incorporated therein. It has been discovered that hydrocarbon-based secondary mixtures having a heating value of 5000 BTU/kg are particularly desirable. Other heating values are contemplated.

It has been discovered that a secondary mixture of inorganic and/or organic materials may most desirably be added into the SCM below a level of the top surface of a turbulent melt matrix formed by melting a primary inorganic feedstock (glass, rock wool, etc., as described above). As used herein for clarity, the primary inorganic feedstock may be referred to generally as batch or feedstock, while the secondary inorganic and/or organic materials may be referred to generally as the secondary mixture, mixture materials, or waste mixture. By adding the inorganic and organic materials below the top level of the melt matrix, the potential of the organic compounds within the mixture being flared off without releasing its energy within the molten pool of melt matrix is minimized or eliminated. It may be desirable to add additional oxidant (e.g., air or oxygen) to the melter to combust the organics added as part of the secondary organic/inorganic mixture. In addition, primary raw feedstock materials or batch may be added either with the secondary mixture or through a separate feed location within the melter. In the examples depicted herein, the raw feedstock material is described as being added separately from the secondary mixture. This can help control the rate of introduction of the secondary mixture into the melter, so as to achieve appropriate chemistries at the melter exit to enable downstream processing and product characteristics for glass wool, reinforcement fiber, rock wool, etc.

Returning to FIG. 1, as described above, the primary feedstock is introduced via the feeder 134, which deposits the primary feedstock above the average matrix melt level 107, which is the highly turbulent surface of the matrix. The secondary mixture may be introduced in a number of different locations to the vessel 101, e.g., to a melt region of the melt vessel 101. For example, the melt region may be defined by a proximity to the burners 112, and a distance away from the melter exit structure 128. In FIG. 1, the secondary mixture is introduced, in one example, via a secondary inlet 138 in the melt region proximate the burners 112. By locating the secondary inlet as depicted, any organic materials in the secondary mixture have sufficient time to combust (so as to provide additional heat energy to the matrix), and any inorganic materials (silica, e.g.) have sufficient time to be completely incorporated into the matrix, prior to reaching the melter exit structure 128. This aids in producing a homogenous matrix for products formed from the cooled matrix material. In another example, a secondary inlet 138' is disposed proximate the vessel floor 102, between adjacent burners 112. Again, by locating the secondary inlet 138' proximate the burners 112, the organic and inorganic compounds present in the mixture can be combusted or incorporated, respectively. In yet another example, a secondary inlet 138" may be incorporated into one or more of the burners 110. Examples of burners 110 that incorporate such a secondary inlet 138" are described below.

Figure 2:
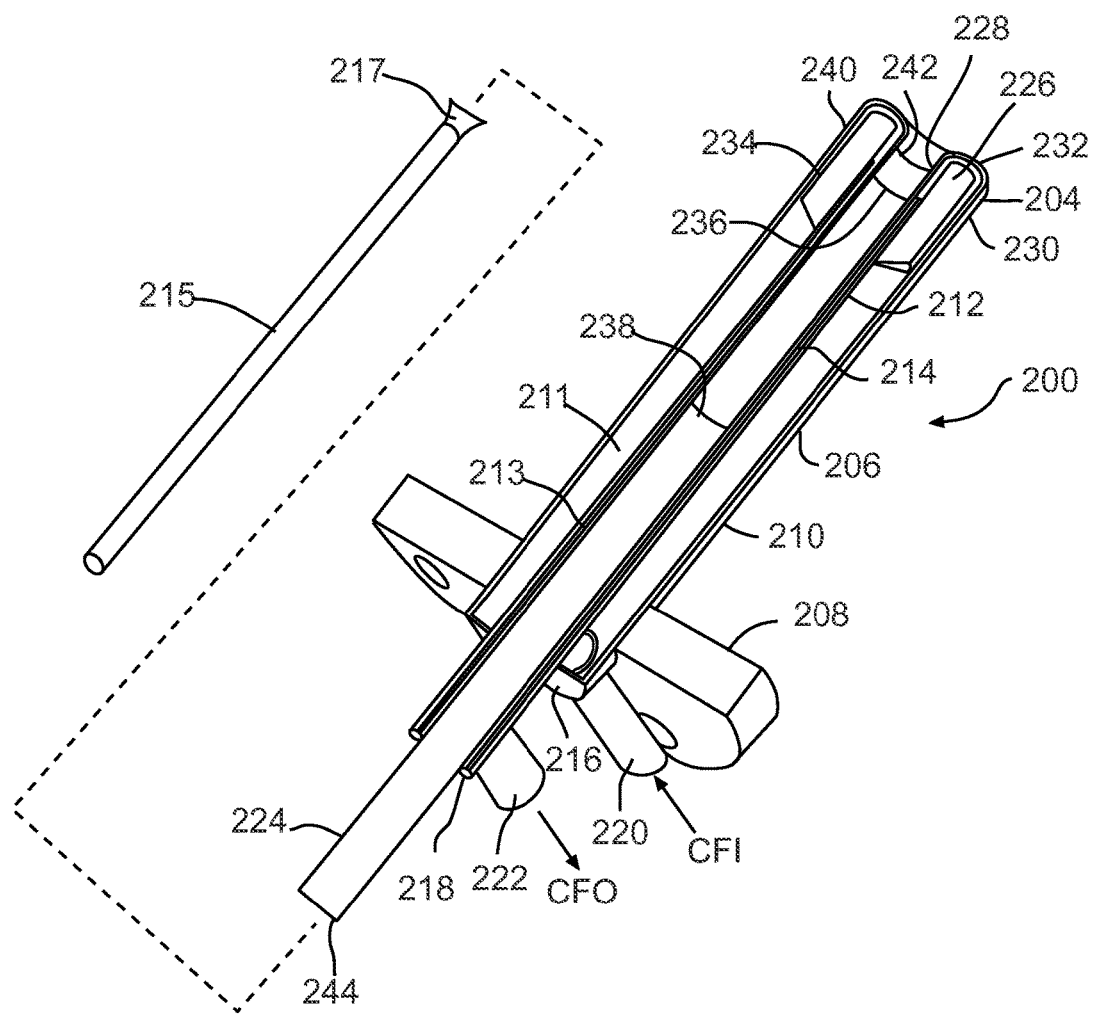
FIG. 2 depicts a side sectional view of a burner that may be utilized in submerged combustion melting.

FIG. 2 depicts a side sectional view of a burner 200 that may be utilized in SCM. The burner 200 is described so as to familiarize the reader with known components of SCM burners. Other examples of SCM burners that can be used in conjunction with the technologies described herein are described in PCT Application Publication No. 2014/189501, the disclosure of which is hereby incorporated by reference herein in its entirety. The burner 200 is an SCM burner having a fluid-cooled portion 202 having a burner tip 204 attached to a burner body 206. A burner main flange 208 connects the burner to an SCM superstructure or flange, illustrated below. Burner body 206 has an external conduit 210, a first internal conduit 212, a second internal conduit 214, and end plates 216, 218. A coolant fluid inlet conduit 220 is provided, along with a coolant fluid exit conduit 222, allowing ingress of a cool coolant fluid as indicated by an arrow CFI, and warmed coolant fluid egress, as indicated by an arrow CFO, respectively. A first annulus 211 is thus formed between substantially concentric external conduit 210 and first internal conduit 212, and a second annulus 213 is formed between substantially concentric first and second internal conduits 212, 214. A proximal end 224 of second internal conduit 214 may be sized to allow insertion of a fuel or oxidant conduit 215 (depending on the burner arrangement), which may or may not include a distal end nozzle 217. When conduit 215 and optional nozzle 217 are inserted internal of second internal conduit 214, a third annulus is formed there between. In certain examples, oxidant flows through the third annulus, while one or more fuels flow through conduit 215, entering through a port 244. In certain other examples, one or more fuels flow through the third annulus, while oxidant flows through conduit 215, entering through port 244.

The fluid-cooled portion 202 of the burner 200 includes a ceramic or other material insert 226 fitted to the distal end of first internal conduit 212. Insert 226 has a shape similar to but smaller than burner tip 204, allowing coolant fluid to pass between burner tip 204 and insert 226, thus cooling burner tip 204. Burner tip 204 includes an inner wall 228, an outer wall 230, and a crown 232 connecting inner wall 228 and outer wall 230. In prior art burners, welds at locations 234 and 236, and optionally at 238, 240 and 242, connect burner tip 204 to external conduit 210 and second internal conduit 214, using conventional weld materials to weld together similar base metal parts, such as carbon steel, stainless steel, or titanium. Despite the use of coolant and even titanium (which ordinarily is considered quite corrosion-resistant), the operating life of burners as illustrated and described in relation to FIG. 2 are very limited in the SCM environment, where temperatures of the molten matrix may reach 1300° C., and the turbulence of the molten matrix caused by the burners themselves as well as combustion gases contribute to form a highly erosive environment in contact with the burner tip. SCM melters that utilize so-called dry tip burners can also benefit from the technologies described herein. Application of the technologies described herein to such dry tip burners will be apparent to a person of skill in the art.

Figure 3:
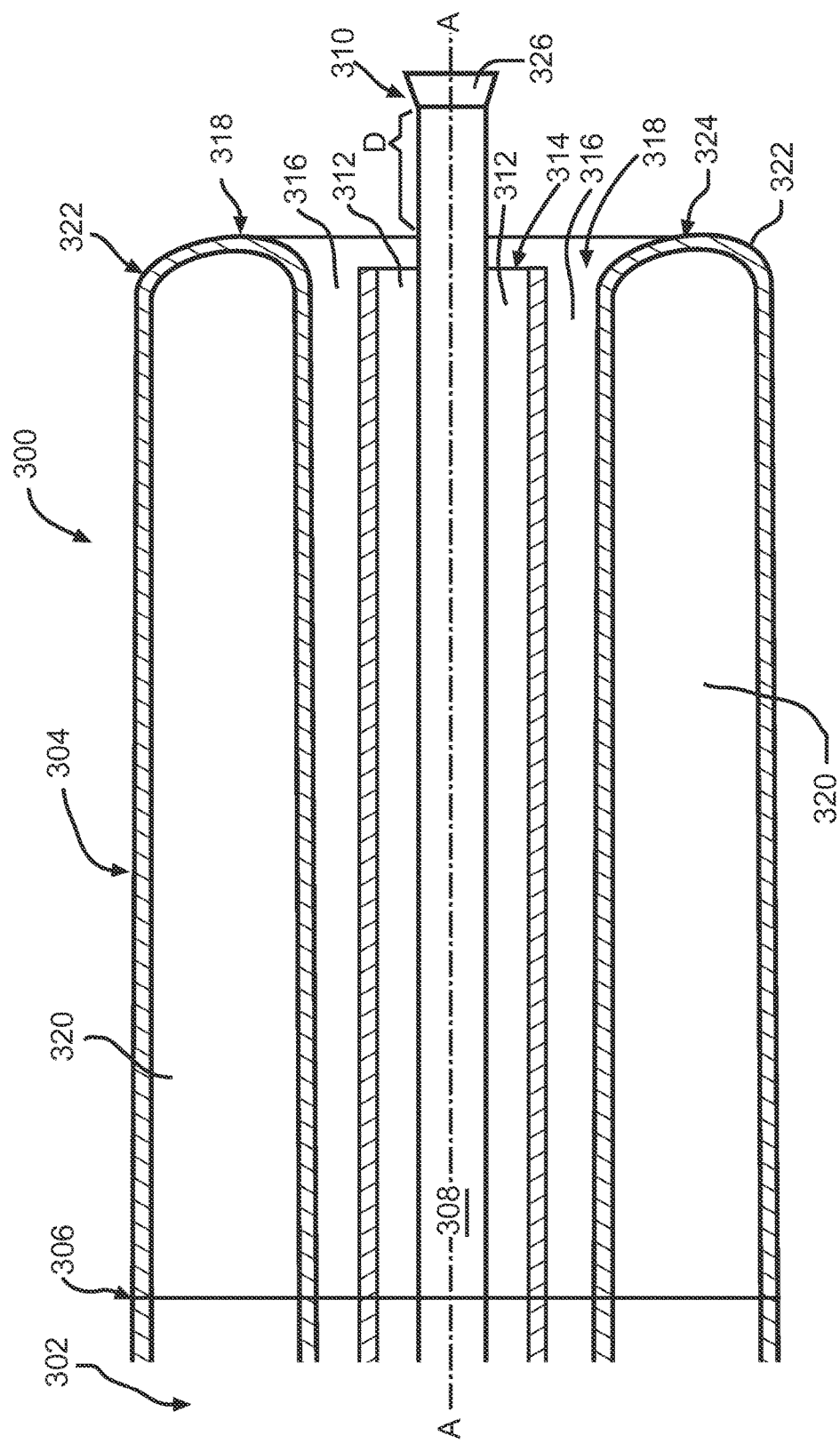
FIG. 3 depicts a partial schematic side sectional view of a burner that may be utilized in conjunction with the examples of the technology described herein.

FIG. 3 depicts a partial schematic side sectional view of a burner 300 that may be utilized in conjunction with the examples of the technology described herein. The burner 300 includes a burner body 302 and a burner tip 304. The burner body 302 and tip 304 may be connected to each other at an interface 306, e.g., as described in PCT Application Publication No. 2014/189501, the disclosure of which is hereby incorporated by reference herein in its entirety. The burner body 302 and burner tip 304 may be constructed with a plurality of conduits therein. In the depicted example, the conduits in the burner tip 304 include a number of concentric annular conduits disposed around each other. Each conduit in the burner tip 304 may be connected at a first end thereof (proximate an interface 306) to an associated conduit in the burner body 302. An opposite end of each conduit in the burner body 302 is connected to a source of the particular gas or liquid that is introduced via the particular conduit. An internal conduit 306 is centrally disposed within the burner 300 and has a substantially cylindrical shape. The internal conduit 306 has a central bore that may be aligned along an axis A of the burner 300 and is configured to introduce or discharge the secondary mixture into the melt vessel, via an open end or exit 310.

Surrounding the internal conduit 306 is a first annular conduit 312 that may be used to introduce or discharge either or both of a fuel and an oxidant to the melt vessel, again via an open end or exit 314. A second annular conduit 316 surrounds the first annular conduit 312 and, like the first annular conduit 312, may be used to introduce or discharge either or both of a fuel and an oxidant to the melt vessel, via an open end or exit 318. In certain examples, an oxidant may be introduced via the first annular conduit 312, while fuel may be introduced via the second annular conduit 316. This may be advantageous, as it locates oxidant close to the secondary mixture being expelled from the internal conduit 308, which may aid in efficient combustion of the secondary mixture. The introduction of secondary mixture is added directly to the combustion generated by the oxidant and fuel. An external conduit 320 may also be annular in configuration, surrounding the second annular conduit 316, and is configured to circulate a cooling fluid, as described above. As such, a second end 322 of the external conduit 320 is closed so as to prevent the cooling fluid from being discharged into the vessel.

In FIG. 3, the open end 310 of the internal conduit 308 extends a distance D from a terminus 324 of the burner tip 304, while the other conduits 312, 316 that introduce oxidant and fuel to the vessel terminate substantially at the terminus 324. This distance D may be beneficial so as to introduce the secondary mixture (e.g., in the form of a slurry) above the fuel and oxidant introduction point. This will introduce the secondary mixture directly into an oxidative flame and help promote immediate combustion thereof. In other examples, the distance D may be zero, such that the secondary mixture is introduced at substantially the same point as the oxidant and fuel. Indeed, any injection point may be utilized, provided the overall fuel-to-oxidant ratio is sufficient given the violent mixing within the SCM melter. As each of the oxidant, fuel, and secondary mixture enters the intense heat of the melt region of the SCM vessel, combustion will begin.

The open end 310 of the internal conduit 308 may be capped with a nozzle 326 to improve discharge characteristics of the secondary mixture, either by spreading, volatizing, or otherwise dispersing the secondary mixture as it enters the melt region of the SCM vessel. Areas of the open ends 310, 314, 318 of the conduits may vary in particular burners 300, as required or desired for a particular application. The areas may depend, at least in part, on oxidant, fuel, and secondary mixture type. For example, oxidants that comprise primarily air have typically only one-fifth the oxygen content of an oxidant of pure oxygen. As such, the size of the oxidant opening would vary depending on the oxygen content of the oxidant opening. BTU output of the secondary mixture is also a relevant factor in determining output area.

The fuel, oxidant, and secondary mixtures may all be introduced to the melt region of the SCM melter at pressures and flow rates that promote proper combustion of organic compounds and incorporation of inorganic compounds. By balancing the pressure of these introduced elements, backflow of fuel or oxidants into their respective conduits will be reduced or eliminated. Additionally, flow rates and pressures of fuel and oxidant may be dependent on the BTU content of the secondary mixture, fuel and/or oxidant type, etc. In examples, exhaust gas species may be monitored for oxygen and the flow rates of the fuel and/or oxidant adjusted to ensure complete combustion thereof (as well as complete combustion of organics within the secondary mixture). This monitoring and adjustment allows the flow rates and pressures of the secondary mixture, fuel, and oxidant to be adjusted, allows different secondary mixtures to be utilized, and also allows for adjustment for organic content variability within the secondary mixture. Desired rates of heat introduction may also be adjusted by monitoring the various element inputs.

Figure 4:
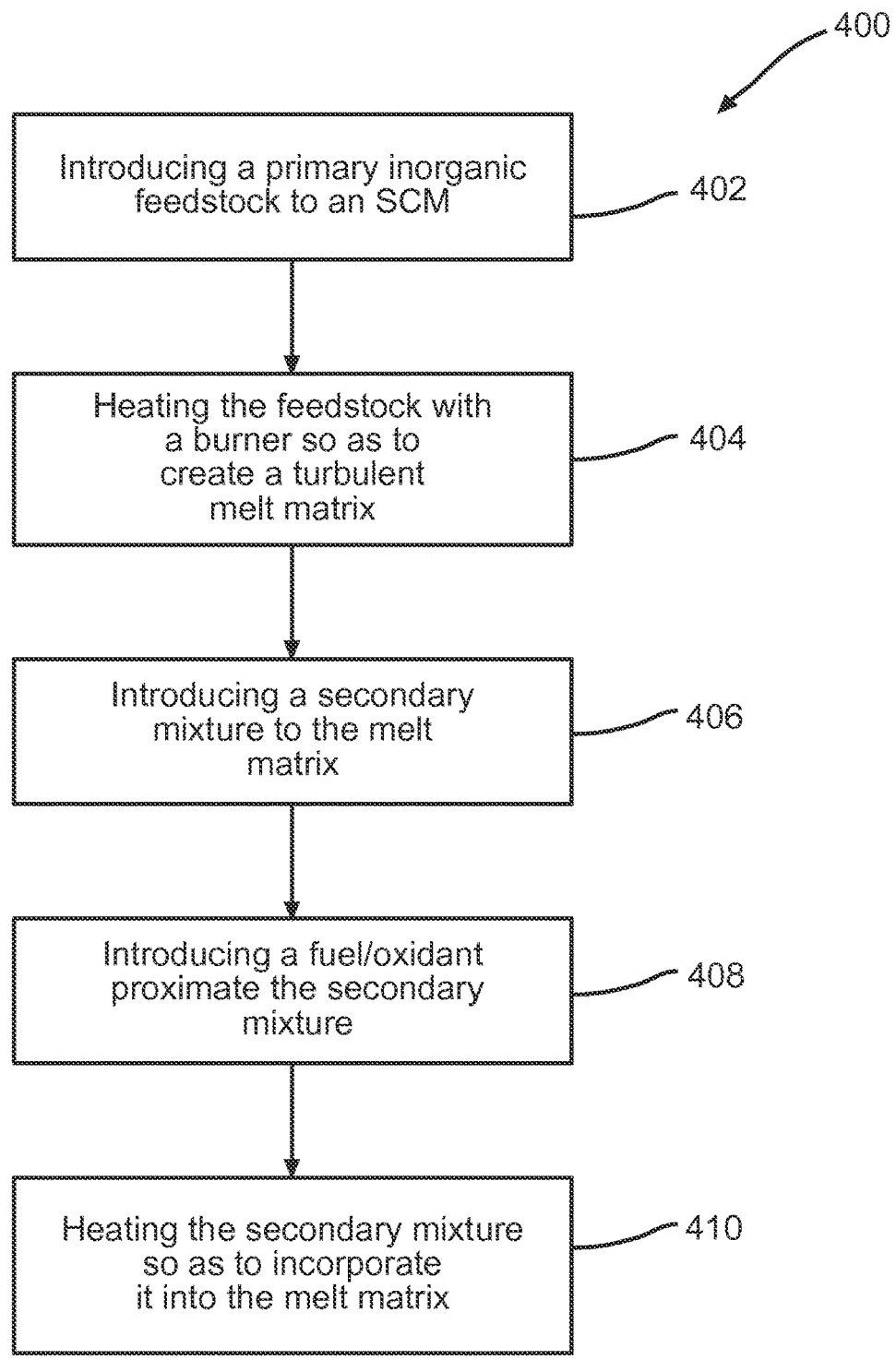
FIG. 4 depicts a method of processing organics and inorganics in a submerged combustion melter.

FIG. 4 depicts a method 400 of processing organics and inorganics in a submerged combustion melter. The incorporation into a melt matrix of secondary mixtures that include only organics or only inorganics is also contemplated. The method 400 begins at operation 402, where a primary inorganic feedstock, such as those described above, is introduced to a melt region of an SCM. This primary feedstock is heated with a burner in operation 404, so as to melt the feedstock into a turbulent melt matrix. In examples, the burner that melts the primary feedstock is disposed below a top surface of the melt matrix produced. A secondary mixture, having organic and/or inorganic compounds, is introduced to the melt matrix in operation 406. It has been discovered that introducing the secondary mixture at a level below the top surface of the melt matrix can aid in thorough incorporation inorganic compounds, as well as combustion of organic compounds contained therein. In certain examples, fuel and/or oxidant, which is regularly introduced to the melt region of the SCM burner, can also be introduced proximate the mixture, so as to aid in combustion thereof, operation 408. The secondary mixture may be introduced via a discrete inlet port near the burner, or may be introduced via the burner itself, e.g., utilizing a configuration of the burner described above. If introduced via the burner, the burner may be configured such that during introduction, oxidant substantially surrounds the secondary mixture, while fuel substantially surrounds the oxidant. This can aid in thorough combustion of the mixture. Upon introduction of the fuel, oxidant, and secondary mixture, the melt matrix is further heated, causing the organic compounds in the mixture to combust, while inorganic materials are incorporated into the matrix, operation 410.

Figure 5:
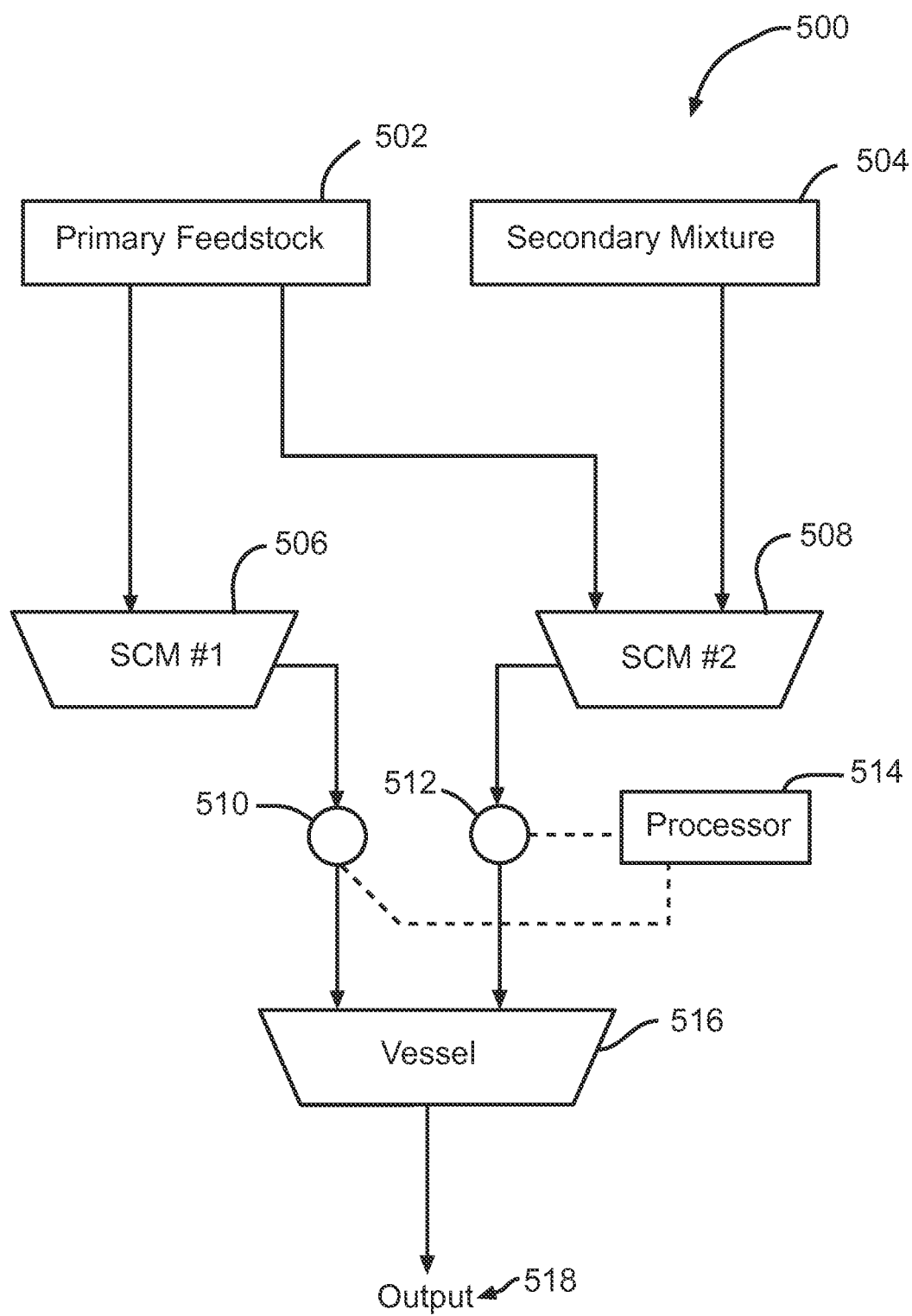
FIG. 5 depicts a schematic view of a melt system.

FIG. 5 depicts a schematic view of a melt system 500 that incorporates the technologies described herein. The melt system 500 includes sources of a primary feedstock 502 and a secondary mixture 504. The primary feedstock 502 is introduced to a first SCM vessel 506 that contains only primary feedstock 502. The primary feedstock 502 is also introduced to a second SCM vessel 508, which can also include the secondary mixture 504. As such, the composition of the output from the first SCM vessel 506 is generally known when it reaches a control station 510. The output from the second SCM vessel 508, however, may contain different amounts of inorganic materials, unprocessed waste, waste byproducts, etc., which may vary depending on the content of the secondary mixture 504 and processing parameters of the second SCM vessel 508. This output may be detected and analyzed at a control station 512, e.g., with flow meters, viscosity measuring instruments, etc. The control station 512 may send results to a system processor 514 for analysis. Based on the output characteristics of the second SCM vessel 508, the processor 514 may send signals to either or both of the control stations 510, 512 to control introduction of material to a further vessel 516. This vessel 516 may serve as a final mixing volume and holding station for the outputs from the first SCM vessel 506 and the second SCM vessel 508. A final output 518 having the desired characteristics may then be discharged from the vessel 518. The ratio of outputs from the first SCM vessel 506 and the second SCM vessel 508 may be mixed based on the materials melted in the various vessels, with outputs from vessels fed by variable waste streams (e.g., municipal waste) making up potentially a lower total ratio of the final, blended, product.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method comprising:
introducing a primary inorganic feedstock material into a melting region of a submerged combustion melter;
heating the primary inorganic feedstock material with a fuel introduced via a fuel exit of a burner so as to form a turbulent melt matrix, wherein the fuel exit of the burner is disposed below a top surface of the turbulent melt matrix;
introducing a waste mixture into the melting region, wherein the waste mixture comprises at least one of a secondary inorganic material and an organic material, and is introduced below the top surface of the turbulent melt mixture via a waste mixture exit of the burner, wherein the waste mixture exit is discrete from the fuel exit and extends a distance from both the fuel exit and a terminus of a tip of the burner; and
heating the waste mixture with the fuel introduced via the fuel exit of the burner so as to incorporate the secondary inorganic material of the waste mixture material into the turbulent melt matrix and combust at least some of the organic material to produce heat.

2. The method of claim 1, wherein the waste mixture includes an organic compound having a heating value of at least 5000 BTU/kg.

3. The method of claim 1, wherein the waste mixture includes at least one of a tar sand waste, a fracking waste fluid, a household waste material, and a chemical processing waste material.

4. The method of claim 1, wherein the inorganic feedstock is selected from the group consisting of glass batch, basalt rock, and mixtures thereof.

5. The method of claim 4, wherein the inorganic feedstock consists essentially of glass batch.

6. The method of claim 4, wherein the inorganic feedstock consists essentially of basalt.

7. The method of claim 1, wherein the waste mixture is introduced as a slurry.

8. The method of claim 1, wherein the waste mixture exit is disposed at a conduit axially extending from a terminus of the burner.

9. The method of claim 1, wherein, during heating, the fuel substantially surrounds the waste mixture.

10. The method of claim 1, further comprising introducing an oxidant to the melt matrix via an oxidant exit of the burner, wherein the oxidant exit is discrete from both the waste mixture exit and the fuel exit.

11. A method comprising:
- melting with a fuel introduced via a fuel exit of a burner, in a melting region of a submerged combustion melter, a feedstock material so as to form a turbulent melt matrix, wherein the fuel exit of the burner is disposed below a top surface of the turbulent melt matrix;
- introducing a waste mixture into the melting region via a waste mixture exit of the burner, wherein the waste mixture is substantially different than the feedstock material and is introduced below the top surface of the turbulent melt mixture, wherein the waste mixture exit is discrete from the fuel exit and extends a distance from both the fuel exit and a terminus of a tip of the burner; and
- heating the waste mixture with the fuel introduced via the fuel exit of the burner so as to incorporate the waste mixture into the turbulent melt matrix and combust at least some of the waste mixture to produce heat.

12. The method of claim 11, wherein the feedstock material consists essentially of at least one of glass batch and basalt.

13. The method of claim 11, wherein the waste mixture comprises at least one of an organic compound and an inorganic compound.

14. The method of claim 13, wherein the waste mixture includes at least one of a tar sand waste, a fracking waste fluid, a household waste material, and a chemical processing waste material.

15. The method of claim 11, wherein the waste mixture exit is disposed at a conduit axially extending from a terminus of the burner.

16. The method of claim 11, further comprising introducing an oxidant to the turbulent melt matrix at an oxidant exit of the burner, wherein the oxidant exit is discrete from both the waste mixture exit and the fuel exit.

17. The method of claim 16, wherein, during introduction at the burner, the at least one of the oxidant and the fuel substantially surrounds the waste mixture.

18. The method of claim 17, wherein, during introduction, the oxidant substantially surrounds the waste mixture and the fuel substantially surrounds the oxidant.

* * * * *